United States Patent

Yu et al.

(10) Patent No.: US 6,649,692 B2
(45) Date of Patent: Nov. 18, 2003

(54) ORGANOPOLYSILOXANE COMPOSITION, EMULSION-FORMING CONCENTRATES AND AQUEOUS EMULSIONS FORMED THEREFROM AND USE OF THE EMULSIONS IN THE TREATMENT OF TEXTILES

(75) Inventors: Hua Yu, White Plains, NY (US); John L. Lombardo, Cold Spring, NY (US)

(73) Assignee: Crompton Corporation, Middlebury, CT (US)

( * ) Notice: Subject to any disclaimer, the term of this patent is extended or adjusted under 35 U.S.C. 154(b) by 0 days.

(21) Appl. No.: 09/788,765

(22) Filed: Feb. 20, 2001

(65) Prior Publication Data

US 2003/0022982 A1 Jan. 30, 2003

(51) Int. Cl.$^7$ ................................................. C08L 83/00
(52) U.S. Cl. ..................... 524/838; 252/8.61; 252/8.62; 252/8.63; 524/366; 524/378; 524/588; 524/837; 525/477
(58) Field of Search .......................... 525/477; 528/38; 252/8.61, 8.62, 8.63; 524/806, 537, 838, 366, 378

(56) References Cited

U.S. PATENT DOCUMENTS

| | | |
|---|---|---|
| 4,184,004 A | 1/1980 | Pines et al. |
| 4,283,519 A | 8/1981 | Pines et al. |
| 4,359,545 A | 11/1982 | Ona et al. |
| 4,459,382 A | 7/1984 | Ona et al. |
| 4,541,936 A | 9/1985 | Ona et al. |
| 4,661,577 A | 4/1987 | Jo Lane et al. |
| 4,725,635 A | 2/1988 | Okada et al. |
| 4,757,121 A | 7/1988 | Tanaka et al. |
| 5,000,861 A | 3/1991 | Yang |
| 5,025,076 A | 6/1991 | Tanaka et al. |
| 5,039,738 A | 8/1991 | Czech |
| 5,091,105 A | 2/1992 | Madore et al. |
| 5,254,269 A | 10/1993 | Taylor et al. |
| 5,258,451 A | 11/1993 | Ohsawa et al. |
| 5,269,951 A | 12/1993 | McVie et al. |
| 5,302,657 A | 4/1994 | Huhn et al. |
| 5,302,659 A | 4/1994 | Bindl et al. |
| 5,310,772 A | 5/1994 | Blanch et al. |
| 5,338,352 A | 8/1994 | Breneman et al. |
| RE35,229 E | 5/1996 | Blanch et al. |
| 5,516,822 A | 5/1996 | Blanch et al. |
| 5,593,611 A | 1/1997 | Czech |
| 5,759,208 A | 6/1998 | Zhen et al. |
| 5,807,956 A | 9/1998 | Czech |
| 5,811,482 A | 9/1998 | Sabia et al. |
| 5,856,544 A | 1/1999 | Czech |
| 5,981,681 A | 11/1999 | Czech |
| 6,114,299 A | 9/2000 | Hunter et al. |

FOREIGN PATENT DOCUMENTS

| | | | |
|---|---|---|---|
| EP | 0523910 A1 | 1/1993 | |
| JP | 04011080 A  * | 1/1992 | .......... D06M/15/65 |
| WO | WO 97/32917 | 9/1997 | |

* cited by examiner

Primary Examiner—Robert Dawson
Assistant Examiner—Marc S Zimmer
(74) Attorney, Agent, or Firm—Michael P. Dilworth

(57) ABSTRACT

An organopolysiloxane composition which comprises:
a) organopolysiloxane I of the general formula:

$$A(Si(R^1)_2O)_a(SiR^1O)_bSi(R^1)_2A$$

$$R^2(NH_2CH_2CH_2)_cNHR^3;$$

b) organopolysiloxane II of the general formula:

$$(AB)_nA$$

where A is a polysiloxane unit of the general formula:

$$(X(C_aH_{2a}O)_bR^2(Si(R^1)_2O_cR^2(OC_aH_{2a})_bX)$$

and B is a polyalkyleneoxide unit of the general formula $(YO(C_aH_{2a})_dY)$;

c) organopolysiloxane III of the general formula:

$$A(Si(R^1)_2O)_x(Si(R^1)(E)O)_y(Si(R^1)(G)O)_zSi(R^1)_2A$$

G is $-(R^2)_bO(C_2H_4O)_c(C_3H_6O)_dR^3$ group; and
d) organopolysiloxane IV of the general formula:

$$A(Si(R^1)_2O)_x(Si(R^1)(G)_ySi(R^1)_2A$$

where G is $-(R^2)_bO(C_2H_4O)_c(C_3H_6O)_dR^3$ group.

53 Claims, No Drawings

ORGANOPOLYSILOXANE COMPOSITION, EMULSION-FORMING CONCENTRATES AND AQUEOUS EMULSIONS FORMED THEREFROM AND USE OF THE EMULSIONS IN THE TREATMENT OF TEXTILES

BACKGROUND OF THE INVENTION

1. Field of the Invention

This invention relates to an organopolysiloxane composition containing a mixture of several specific types of liquid organopolysiloxanes, to emulsion-forming concentrates and aqueous emulsions formed therefrom and to the treatment of textile fiber and fabric substrates with the emulsions to improve such desirable properties of the substrates as their wettability and softness unaccompanied by any significant or appreciable yellowing.

2. Description of the Prior Art

The formulation and manufacture of organopolysiloxane-based aqueous emulsions and the treatment of natural and synthetic textile fiber and fabric substrates with the emulsions to improve one or more properties of the substrates, in particular, their softness, are well known and well developed technologies.

A major challenge in the formulation of any aqueous organopolysiloxane emulsion intended for use as a textile fiber and/or fabric treating agent is the difficulty of achieving a good, which is to say, commercially acceptable, balance in the properties of the fiber/fabric substrate treated with a given emulsion. For example, one emulsion might provide excellent softness, but at the expense of wettability and/or resistance to yellowing, another emulsion might provide excellent wettability but at the expense of softness and/or resistance to yellowing, and so forth.

Although much effort has been expended to develop aqueous organopolysiloxane emulsions that impart a good balance of properties to textile fiber and fabric substrates treated therewith, the satisfactory attainment of this goal can be quite elusive.

It is therefore an object of the invention to provide an organopolysiloxane composition which, when formulated as an aqueous emulsion and applied to a textile fiber or fabric substrate, will improve the wettability and softness properties of the substrate without, however, causing any significant or appreciable yellowing of the substrate.

Other objects of the invention include methods for making organopolysiloxane emulsion-forming concentrates and stable aqueous organopolysiloxane emulsions and employing the latter as textile treating agents.

SUMMARY OF THE INVENTION

In accordance with the present invention, an organopolysiloxane composition is provided which comprises:

a) organopolysiloxane I of the general formula

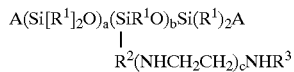

wherein each $R^1$ is, independently, an alkyl group of from 1 to 4 carbon atoms, $R^2$ is a divalent hydrocarbon group, $R^3$ is hydrogen or a monovalent hydrocarbon group, each A is, independently, an $R^1$ group or an $R^2(NHCH_2CH_2)_cNHR^3$ group, provided, that at least one A is an $R^2(NHCH_2CH_2)_cNHR^3$ group, a is from 1 to about 1000, b is from 0 to about 100 and c is from 0 to about 1000;

b) organopolysiloxane II of the general formula $$(AB)_nA$$

wherein n is from 2 to about 1000, A is a polysiloxane unit of the general formula

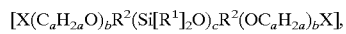

B is a polyalkyleneoxide unit of the general formula $[YO(C_aH_{2a}O)_dY]$, each $R^1$ is, independently, an alkyl group of from 1 to 4 carbon atoms, $R^2$ is a divalent organic group, X and Y are divalent organic groups selected from a secondary or tertiary amine and a ring-opened epoxide such that when X is a ring-opened epoxide, Y is a secondary or tertiary amine and when X is a secondary or tertiary amine, Y is a ring-opened epoxide, each a is, independently, from 2 to 4, each b is independently from 0 to about 100, c is from 1 to about 500, d is from 0 to about 100 and the sum of b and d is from 1 to about 100;

c) organopolysiloxane III of the general formula

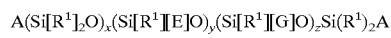

wherein each $R^1$ is, independently, an alkyl group of from 1 to 4 carbon atoms, E is a monovalent organic group containing at least one epoxy group, G is an $—(R^2)_bO(C_2H_4O)_c(C_3H_6O)_dR^3$ group in which $R^2$ is a divalent organic group, $R^3$ is hydrogen or a monovalent hydrocarbon group, acyl group or monoester carbonate group, b is 0 or 1, c is from 0 to about 50, d is from 0 to about 50 and the sum of c and d is from 1 to about 100, each A is, independently, an $R^1$ or E group, x is from 0 to about 2000, y is from 0 to about 2000, z is from 1 to about 100 and the sum of x and y is from 1 to about 2000; and, d) organopolysiloxane IV of the general formula

wherein each $R^1$ is, independently, an alkyl group of from 1 to 4 carbon atoms, G is an $—(R^2)_bO(C_2H_4O)_c(C_3H_6O)_dR^3$ group in which $R^2$ is a divalent organic group, $R^3$ is hydrogen, a monovalent hydrocarbon group, an acyl group or a monoester carbonate group, b is 0 or 1, c is from 0 to about 50, d is from 0 to about 50 and the sum of c and d is from 1 to about 100, each A is, independently, an $R^1$ group or a monovalent organic group containing at least one epoxy group; x is from 0 to about 2000, y is from 0 to about 2000, and the sum of x and y is from 1 to about 2000.

Aqueous emulsions formed from the foregoing organopolysiloxane composition when applied in accordance with known and conventional methods to natural or synthetic textile fiber and fabric substrates, provide excellent levels of softness and wettability to the substrates but without discernable or apparent yellowing.

DETAILED DESCRIPTION OF THE INVENTION

1. The Components of the Organopolysiloxane Composition

As indicated above, the organopolysiloxane composition of this invention contains individual organopolysiloxanes I-IV as hereinafter further described.

Organopolysiloxane I

Organopolysiloxane I possesses the general formula

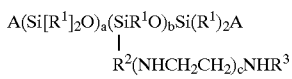

wherein each $R^1$ is, independently, an alkyl group of from 1 to 4 carbon atoms, $R^2$ is a divalent hydrocarbon group, $R^3$ is hydrogen or a monovalent hydrocarbon group, each A is, independently, an $R^1$ group or an $R^2(NHCH_2CH_2)_cNHR^3$ group, provided, that at least one A is an $R^2(NHCH_2CH_2)_c NHR^3$ group, a is from 1 to about 1000, b is from 0 to about 100 and c is from 0 to about 10.

In organopolysiloxane I, each $R^1$ is preferably a methyl group, $R^2$ is preferably a straight or branched chain alkylene group of from 2 to about 10 carbon atoms, ethylene and propylene being especially preferred, $R^3$ is preferably an alkyl group of from 1 to about 10 carbon atoms, methyl being especially preferred, a is preferably from about 50 to about 700, b is preferably from about 1 to about 30, c is preferably from 1 to 4 and the sum of a and b is preferably from about 50 to about 730.

For further details concerning organopolysiloxane I, reference may be made to U.S. Pat. No. 4,459,382, the contents of which are incorporated by reference herein. Organopolysiloxane I is advantageously present in the emulsion-forming concentrate at a level of from about 1 to about 50, and preferably from about 5 to about 20, weight percent based on the total weight of organopolysiloxanes I-IV.

Organopolysiloxanes II

Organopolysiloxane II possesses the general formula $$(AB)_nA$$

wherein n is from 2 to about 1000, A is a polysiloxane unit of the general formula $$[X(C_aH_{2a}O)_bR^2(Si[R^1]_2O)_cR^2(OC_aH_{2a})_bX],$$

B is a polyalkyleneoxide unit of the general formula [YO $(C_aH_{2a}O)_dY$], each $R^1$ is, independently, an alkyl group of from 1 to 4 carbon atoms, $R^2$ is a divalent organic group, X and Y are divalent organic groups selected from a secondary or tertiary amine and a ring-opened epoxide such that when X is a ring-opened epoxide, Y is a secondary or tertiary amine and when X is a secondary or tertiary amine, Y is a ring-opened epoxide, each a is, independently, from 2 to 4, each b is independently from 0 to about 100, c is from 1 to about 500, d is from 0 to about 100 and the sum of b and d is from 1 to about 100.

In organopolysiloxane II, n is preferably from about 1 to about 10, each $R^1$ is preferably a methyl group, $R^2$ is preferably an ethylene or propylene group, each a is preferably 2 or 3, each b is preferably from 1 to about 50, c is preferably from 10 to about 100, d is preferably from 1 to about 50, the sum of b and d is preferably from about 10 to about 50, when a ring-opened epoxide, X or Y, as the case may be, is preferably a —$CH_2CH(OH)(CH_2)_vCH(OH)CH_2$—, —$CH[CH_2OH](CH_2)_vCH(CH_2OH)$—, —$CH_2CH(OH)(CH_2)_vCH[CH_2OH]$—, —$(CH_2)_vOCH_2CH(OH)CH_2$— or —$(CH_2)_vOCH_2CH(CH_2[OH])$— group in which v is from 2 to about 6, or a ring-opened epoxide derived from ω-(3,4-epoxycyclohexyl) alkylene, β-(3,4-epoxycyclohexyl) ethylene, β-(3,4-epoxycyclohexyl)-β-methyethylene or β-(3,4-epoxy-4-methylcyclohexyl)-β-methyethylene, and when a secondary or tertiary amine, X or Y, as the case may be, is preferably of the type —$R^4N(R^3)(R^4)_g$— in which $R^3$ is hydrogen or an alkyl group of from 1 to 4 carbon atoms, methyl being especially preferred, and $R^4$ is and alkylene, cycloaliphatic alkylene or aralkylene group, which may include heteroatom(s), an alkylene of less than 10 carbons being especially preferred, and g is 0 or 1.

It is preferred that the amine functionality in organopolysiloxane II be present in the terminal A group of the $(AB)_n$ A polymer. The polyoxyalkylene blocks represented by $(C_aH_{2a}O)$ or $(OC_aH_{2a})$ may be derived from one or more of the following alkylene oxides: ethylene oxide (a=2), propylene oxide (a=3) and butylene oxide (a=4). The ratios among mixtures of such oxides is not of particular importance but may be adjusted as required for the desired solubility parameters of the resulting copolymer.

For further details concerning organopolysiloxane II, reference may be made to U.S. Pat. No. 5,807,956, the contents of which are incorporated by reference herein. Organopolysiloxane II is advantageously present in the emulsion-forming concentrate at a level of from 1 to about 80, and preferably from about 10 to about 50, weight percent based on the total weight of polyorganosiloxanes I-IV.

Organopolysiloxane III c) Organopolysiloxane III possesses the general formula

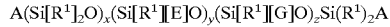

wherein each $R^1$ is, independently, an alkyl group of from 1 to 4 carbon atoms, E is a monovalent organic group containing at least one epoxy group, G is an —$(R^2)_bO(C_2H_4O)_c(C_3H_6O)_{dR^3}$ group in which $R^2$ is a divalent organic group, $R^3$ is hydrogen or a monovalent hydrocarbon group, acyl group or monoester carbonate group, b is 0 or 1, c is from 0 to about 50, d is from 0 to about 50 and the sum of c and d is from 1 to about 100, each A is, independently, an $R^1$ or E group, x is from 0 to about 2000, y is from 0 to about 2000, z is from 1 to about 100 and the sum of x and y is from 1 to about 2000.

In organopolysiloxane III, each $R^1$ is preferably methyl, E is preferably an epoxy-containing group of the structure

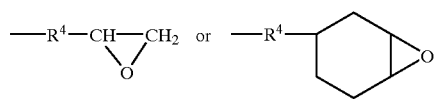

in which $R^4$ is a divalent substituted or unsubstituted organic group such as methylene, ethylene, propylene, phenylene, chloroethylene, flouroethylene, —$CH_2OCH_2CH_2CH_2$—, —$CH_2CH_2OCH_2CH_2$—, —$CH_2OCH_2CH_2(CH_3)OCH_2CH_2$— or —$CH_2CH_2OCH_2CH_2$—, in group G, divalent organic group $R^2$ is preferably selected from alkylene groups of from 1 to about 5 carbon atoms and groups in which a —$C_6H_4$— group, —CO— group or —NHCO— group is bonded to an alkylene group, $R^3$ is preferably hydrogen, an alkyl group of from 1 to 4 carbon atoms, an acyl group of from 1 to 4 carbon atoms or a monoester carbonate group of from 1 to 4 carbon atoms in its ester moiety, b is preferably 3, c is preferably from 1 to about 35, d is preferably from 1 to about 35 and the sum of c and d is preferably from 2 to about 70, A is preferably selected from one of the aforesaid preferred $R^1$ and preferred E groups, x is preferably from about 10 to about 1000, y is preferably from about 1 to about 50, z is preferably from 1 to about 50 and the sum of x and y is preferably from 1 to about 1100.

For further details concerning organopolysiloxane III, reference may also be made to U.S. Pat. No. 4,459,382 referred to supra. Organopolysiloxane III is advantageously present in the emulsion-forming concentrate at a level of from about 5 to about 50, and preferably from about 10 to about 30, weight percent based on the total weight of organopolysiloxanes I-IV.

Organopolysiloxane IV

Organopolysiloxane IV possesses the general formula

wherein each $R^1$ is, independently, an alkyl group of from 1 to 4 carbon atoms, G is an —$(R^2)_bO(C_2H_4O)_c(C_3H_6O)_dR^3$ group in which $R^2$ is a divalent organic group, $R^3$ is hydrogen, a monovalent hydrocarbon group, an acyl group or a monoester carbonate group, b is 0 or 1, c is from 0 to about 50, d is from 0 to about 50 and the sum of c and d is from 1 to about 100, each A is, independently, an $R^1$ group or a monovalent organic group containing at least one epoxy group; x is from 0 to about 2000, y is from 0 to about 2000, and the sum of x and y is from 1 to about 2000.

In organopolysiloxane IV, $R^1$ is preferably methyl, in group G, divalent organic group $R^2$ is preferably selected from alkylene groups of from 1 to about 5 carbon atoms and groups in which a —$C_6H_4$— group, —CO— group or —NHCO— group is bonded to an alkylene group, $R^3$ is preferably hydrogen, an alkyl group of from 1 to 4 carbon atoms, an aryl group of from 1 to 4 carbon atoms or a monoester carbonate group of from 1 to 4 carbon atoms in the ester moiety, b is preferably 3, c is preferably from 1 to about 35, d is preferably from 1 to about 35 and the sum of c and d is preferably from 2 to about 70, A is preferably selected from methyl and an epoxy-containing group E of the structure

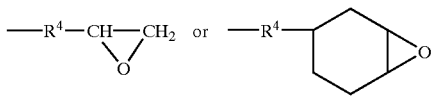

in which $R^4$ is a divalent substituted or unsubstituted organic group such as methylene, ethylene, propylene, phenylene, chloroethylene, flouroethylene, —$CH_2OCH_2CH_2CH_2$—, —$CH_2CH_2OCH_2CH_2$—, —$CH_2OCH_2CH_2(CH_3)$ $OCH_2CH_2$— or —$CH_2CH_2OCH_2CH_2$—, x is preferably from about 10 to about 1000, y is preferably from 1 to about 100 and the sum of x and y is preferably from about 10 to about 1100.

For further details concerning organopolysiloxane IV, reference may again be made to U.S. Pat. No. 4,459,382. Organopolysiloxane IV is advantageously present in the emulsion-forming concentrate at a level of from about 5 to about 50, and preferably from about 10 to about 30, weight percent based on the total weight of organopolysiloxanes I-IV.

2 Concentrates and Aqueous Emulsions of the Organopolysiloxane Composition

The organopolysiloxane composition of this invention is especially adapted to be initially formulated either as an emulsion-forming concentrate from which a stable aqueous emulsion can be readily and conveniently prepared, or if desired, as a finished or semi-finished stable aqueous emulsion. The emulsifiers (surface active agents) that can be used in the formulation of the concentrates and finished/semi-finished aqueous emulsions can be selected from amongst any of the known and conventional emulsifiers suitable for providing stable aqueous emulsions of one or more liquid organopolysiloxanes such as organopolysiloxanes I-IV herein. Thus, for example, one or a combination of any of the following emulsifiers can be employed: nonionic surface active agents such as polyoxyethylene alkyl ethers, polyoxyethylene alkylphenyl ethers, sorbitan fatty acid esters, glycerine fatty acid esters, and the like, anionic surface active agents such as sodium lauryl sulfate, sodium dodecylbenzene solfonate, sodium polyoxyethylene ether carboxylate, and the like, and cationic surface active agents such as quaternary ammonium salts, and the like. It is preferable that at least 50 percent by weight of the total amount of emulsifying agent employed is a nonionic surface active agent or a combination of nonionic surface active agents of which the overall hydrophilic lipophilic balance (HLB) value is from about 8 to about 14.

The amount of emulsifier(s) is not critical and can vary widely provided, of course, that at least an amount of emulsifier(s) is utilized, together with any optional co-emulsifier(s), that will provide a stable emulsion upon addition of water to the organo-polysiloxane composition. In general, the total amount of emulsifier utilized can vary from about 5 to about 100, and preferably from about 10 to about 50, parts by weight per 100 parts by weight of the total quantity of polyorganosiloxanes.

It is also within the scope of the invention to employ an optional co-emulsifier in the preparation of the emulsion-forming concentrate and aqueous emulsions of this invention. Co-emulsifiers that are especially advantageous for use herein include alkoxytriglycols such as methoxytriglycol, ethoxytriglycol, propoxytriglycol, butoxytriglycol, and the like, and polyalkylene glycol alkyl ethers such as diethylene glycol monomethyl ether, diethylene glycol dimethyl ether, dipropylene glycol monomethyl ether, dipropylene glycol dimethyl ether, dibutylene glycol monomethyl ether, dibutylene glycol dimethyl ether, and the like. These and other co-emulsifiers, when present, can generally constitute from about 5 to about 70, and preferably from about 10 to about 50, weight percent of the combined weight of emulsifier(s) and co-emulsifier(s).

Other materials typically employed in the treatment of textile fiber and fabric substrates can be incorporated in the concentrate/emulsion of this invention in the usual amounts. Such materials include durable press resins, curing catalysts, preservatives, biocides, water soluble pigments or dyes, fragrances, fillers, pH adjustors, antifoamers, defoamers, and the like. However, it is preferable that the use of organotitanates, organozirconates, organogermanates and similar organometallic compounds be avoided since they may be irritating, corrosive to equipment or reduce the stability of the emulsions.

Aqueous emulsion-forming concentrates of the mixture of organopolysiloxanes I-IV in accordance with the present invention can be prepared by high shear mixing or agitation of a mixture of the desired polysiloxanes and suitable emulsifiers (surface active agents), optional co-emulsifiers and other optional ingredients as is well known in the art. Thus, the concentrates can be prepared by mixing with a suitable stirrer such as a homomixer or homogenizer. The organopolysiloxanes, emulsifier(s)/optional co-emulsifier(s) and other optional components in the desired amounts with or without an emulsion-forming amount of water (the former when the direct production of a finished or semi-finished emulsion is desired, the latter when a concentrate is desired) are introduced into a suitably equipped vessel. The length of time the mixture is mixed/agitated depends on the balance of the polarity between, or the hydrophilicity of, the selected organopolysiloxanes and the emulsifier(s) and optional co-emulsifier(s). The concentrate and emulsions formed therefrom exhibit excellent stability during storage, when diluted and when subjected to mechanical shearing.

The amounts of water utilized to provide an aqueous emulsion are not critical and can vary considerably depending on the nature and amounts of the components constituting a particular organopolysiloxane composition. In general, an amount of water should be utilized which results in an oil-in-water or water-in-oil type aqueous emulsion of good stability (i.e., no apparent phase separation), e.g., stability for at least about 1, and preferably at least about 7, days following storage at 55° C. Amounts of water in most cases can range from about 20 to about 2000 parts, and preferably from about 100 to about 500, parts by weight per 100 parts by weight of the total amount of organopolysiloxanes. It may be economically beneficial to prepare an emulsion with a high organopolysiloxane content, i.e., a semi-finished emulsion, in order to reduce shipping and/or handling costs and thereafter to dilute the emulsion on site with additional water to application strength prior to use.

The aqueous organopolysiloxane emulsion of this invention can be applied to a textile fiber or fabric substrate by such known and conventional techniques as spraying, dipping, padding, kiss roll, and the like. Such operations can be followed by the removal of excess liquid employing any suitable means, e.g., a mangle, centrifugal separator, and the like, to control the amount of liquid taken up by the substrate followed by drying the treated substrate with or without the application of heat. When drying is accomplished by heating the substrate, the temperature can usually range from about 70° to about 180° C. for from about 1 to about 30 minutes. The amount of the aqueous emulsion applied to the textile fiber or fabric substrate will generally be such as to deposit from about 0.1 to about 5 percent by weight of combined organopolysiloxanes by weight of substrate.

The aqueous organopolysiloxane emulsions of the present invention can be used for the finishing treatment of many kinds of textile fiber and fabric substrates including polyester, acrylic, nylon, aramid and the like, as well as various types of natural fibers such as cotton, silk, wool, and the like. The forms of the substrates are not limited and include filaments, rovings, threads, woven and non-woven fabrics, knit cloths, and the like. The emulsions can also be applied to inorganic fibers such as glass fibers, carbon fibers, and the like.

2. EXAMPLES

In the examples that follow, softness evaluations were performed by a hand panel in accordance with AATCC Evaluation Procedure 5: Guidelines for the Subjective Evaluation of Fabric Hand. A minimum of five different hand panels were utilized. For each softness evaluation, the fabrics tested were rated on a scale of 1 to 8, 8 being softest and 1 being the harshest value.

The wettability evaluations for the tested fabrics were performed by measuring the absorption time of water drops falling upon the fabric surface in accordance with AATCC Test Protocol 79-1995. Within a flat fabric surface area of 176.6 cm$^2$, a total of six sampling points were taken and a final average was determined. The absorption time $T_t$ was the duration of time from when a water drop first contacted the fabric surface to when the drop was completely absorbed into the fabric. A shorter time is more desirable and indicates better wettability.

The whiteness (i.e., resistance to yellowing) property of the tested fabrics was determined by using a COLORQUEST® Colorimeter (Hunter Lab) in accordance with ASTM Method E313-98: Practice for Calculating Yellowness and Whiteness from Instrumentally Measured Color Coordinates. The higher the whiteness reading the more resistant the fabric is to yellowing.

Whereas the exact scope of the instant invention is set forth in the appended claims, the following examples illustrate certain specific aspects of the present invention. These examples are set forth for illustration only and are not to be construed as limiting the present invention.

In Examples 1-6 below, organopolysiloxanes I-IV were employed:

| Organopolysiloxane | Chemical Description |
|---|---|
| I | Amino-functional polysiloxane with amine content of 0.2% and viscosity of 3500 cps. |
| II | Amino-polyalkyleneoxide siloxane $(AB)_n$ A block copolymer with amine content of 0.23% and viscosity of 6000 cps. |
| III | epoxy-functional polyalkyleneoxide-polysiloxane terpolymer with epoxy content of 0.50% and viscosity of 3300 cps. |
| IV | polyalkyleneoxide-siloxane copolymer with ethyleneoxide content of 0.5% and viscosity of 450 cps. |

Example 1

Organopolysiloxane I, 58.3 g, and glacial acetic acid, 1.2 g, were premixed in a 250 ml plastic mixing vessel followed by the addition of 11 g of Ethyl TDA-3 (ethoxylated tridecyl alcohol), 3.8 g of Ethyl TDA-5 (ethoxylated tridecyl alcohol), 14 g of Rhodasur BC-610 (ethoxylated tridecyl alcohol) emulsifiers and 11.7 g of butoxytriglycol co-emulsifier at a moderate speed (about 400 rpm) for 15 minutes. Stirring was continued at a speed sufficient to generate a small vortex (about 600 rpm) whereupon 42.8 g of water were slowly added at a rate such that the mixture was able to absorb it. Mixing was continued for an additional 3-5 minutes resulting in a clear and stable emulsion concentrate with a viscosity of 8-12000 cps and a stability at 55° C. (130° F.) of over 7 days.

Example 2

Organopolysiloxane III, 70 g, was premixed with 1.4 g of Iconol TDA-6 (ethoxylated tridecyl alcohol) and 2.8 g of Iconol TDA-10 (ethoxylated tridecyl alcohol) in a 250 ml plastic mixing vessel at a moderate speed (about 400 rpm) for 15 minutes. Stirring was then continued at a speed sufficient to generate a small vortex (about 600 rpm) whereupon 25.8 g of water were slowly added at a rate such that the mixture was able to absorb it. Mixing was continued for an additional 3-5 minutes resulting in a clear and stable emulsion concentrate with a viscosity of 8-12000 cps and a stability at 55° C. (130° F.) of over 7 days.

Example 3

The emulsion concentrate of Example 1, 6.3 g, containing organopolysiloxane I was premixed with 11 g of organopolysiloxane II, 7 g of the emulsion concentrate of Example 2 containing organopolysiloxane III and 5 g of organopolysiloxane IV in a 250 ml plastic mixing vessel at moderate speed (about 400 rpm) for 15 minutes. Stirring was continued at a speed sufficient to generate a small vortex (about 600 rpm) whereupon 70.7 g of water were slowly added at a rate such that the mixture was able to absorb it. Mixing was continued for an additional 3-5 minutes resulting in a clear and stable emulsion concentrate with a viscosity of 2-100 cps and a stability at 45° C. (130° F.) of over 7 days.

Example 4

The emulsion concentrate of Example 1, 6.3 g, containing organopolysiloxane I was premixed with 11 g of organopolysiloxane II, 7 g of the emulsion concentrate of Example 2 containing organopolysiloxane III, 5 g of organopolysiloxane IV and 1 g of isopropylmyristate in a 250 ml plastic mixing vessel at a moderate speed (about 400 rpm) for 20 minutes resulting in a milky and stable emulsion concentrate with a viscosity of 10-20,000 cps and a stability at 45° C. (130° F.) of over 7 days.

Example 5

Organopolysiloxane I, 194.25 g, was premixed with 5.25 g of glacial acetic acid in a 5 L stainless steel mixing vessel for 5 min at 400 rpm. To this mixture were added 36.75 g of Ethal TDA-3 (ethoxylated tridecyl alcohol), 13.1 g of Ethal TDA-5 (ethoxylated tridecyl alcohol) and 44.6 g of Ethyl TDA-6 (ethoxylated tridecyl alcohol) emulsifiers accompanied by mixing for 5 minutes at 400 rpm. Thereafter, 39.3 g of butoxytriglycol co-emulsifier was added to the mixture and mixing continued for 5 minutes at 400 rpm. Stirring was then carried out at a speed sufficient to generate a small vortex (about 600 rpm) whereupon 532 g organopolysiloxane II were added followed by 241.2 g of organopolysiloxane III and 241.2 g of organopolysiloxane IV accompanied by mixing for 10 minutes. To this mixture were added 2152.5 g of water at a rate such that the mixture was able to absorb it. Mixing was continued for another 5 minutes after the water addition resulting in a milky and stable emulsion with a viscosity of 2-1000 cps and a stability at 45° C. (130° F.) of over 30 days.

Example 6

Organopolysiloxane I, 194.25 g, was premixed with 5.25 g of glacial acetic acid in a 5 L stainless steel mixing vessel for 5 minutes at 400 rpm after which 36.75 g of Ethal TDA-3 (ethoxylated tridecyl alcohol) and 57.7 g of Ethal TDA-6 (ethoxylated tridecyl alcohol) emulsifiers were added to the mixture with mixing continued for 5 minutes at 400 rmp. Thereafter, 39.3 g of butoxytriglycol co-emulsifier was added to the mixture with mixing continued for another 5 minutes at 400 rpm. Stirring was then carried out at a speed sufficient to generate a small vortex (about 600 rpm) whereupon 532 g of organopolysiloxane II, 241.2 g of organopolysiloxane III and 241.2 g of organopolysiloxane IV were added with further mixing for 10 minutes. To this mixture were added 2152.5 g of water at a rate such that the mixture was able to absorb it. Mixing was continued for an another 5 minutes after the water addition resulting in a milky and stable emulsion with a viscosity of 2-1000 cps and a stability at 45° C. (130° F.) of over 30 days.

Examples 7-13

Employing substantially the same procedures described in the previous examples, individual aqueous emulsions (Examples 7-13) were prepared with one or more organopolysiloxanes. The emulsions of Examples 7-13 were applied to 100% cotton terry cloth by the aforesaid pad/dry process. The drying conditions were 130° C./5 minutes. The amounts of organopolysiloxane deposited on the fabric based on fabric weight were 0.5 wt %, 1.0 wt % and 2 wt %, respectively. A softness score of at least about 6.5 and preferably at least about 7, a wettability score of not greater than about 50 and preferably not greater than about 20, a whiteness score of at least about 70 and preferably at least about 72, for at least the two higher levels of application (i.e., 1.0 wt % and 2.0 wt %) and preferably for all three levels of application is indicative of a well balanced textile treating agent.

The organopolysiloxane components of the aqueous emulsions of Examples 7-13 are as follows:

| Example | Organopolysiloxane(s) |
|---|---|
| 1* | I |
| 2* | III |
| 3 | I–IV |
| 4 | I–IV |
| 5 | I–IV |
| 6 | I–IV |
| 7* | substantially chemically equivalent to organopolysiloxane I |
| 8* | substantially chemically equivalent to organopolysiloxane II |
| 9* | substantially chemically equivalent to organopolysiloxane III |
| 10* | IV |
| 11* | II, III |
| 12* | II, III, IV |
| 13* | III, IV |

*Outside the scope of the invention.

The softness, wettability and whiteness evaluations of the test fabrics were carried out employing the procedures described above. The results of the evaluations are presented below in Table I.

TABLE I

Evaluation of Aqueous Organopolysiloxane Emulsions Applied to 100% Cotton Terry Cloth

| Example | Softness 1 = harshness; 8 = softness | | | Wettability (seconds) | | | Whiteness (The higher the value the greater the resistance to yellowing) | | |
|---|---|---|---|---|---|---|---|---|---|
| | 0.5% | 1.0% | 2.0% | 0.5% | 1.0% | 2.0% | 0.5% | 1.0% | 2.0% |
| 1 | 7.0 | 7.5 | 8.0 | >300 | >300 | >300 | 70 | 68.5 | 66.7 |
| 2 | 4 | 4.5 | 5 | <1 | <1 | <1 | 79.2 | 78.9 | 78.6 |
| 3 | 6.5 | 7.0 | 7.0 | 2.3 | 2.5 | 3.1 | 74.2 | 73.5 | 73.1 |
| 4 | 6.75 | 7.0 | 7.5 | 2.1 | 2.3 | 2.7 | 73.8 | 73.4 | 73.2 |
| 5 | 6.5 | 7.0 | 7.5 | 2.2 | 2.4 | 2.8 | 74.4 | 73.8 | 73.3 |
| 6 | 6.5 | 7.0 | 7.5 | 2.3 | 2.5 | 2.8 | 73.9 | 73.7 | 73.4 |
| 7 | 7.0 | 7.5 | 8.0 | >300 | >300 | >300 | 69 | 68.2 | 66.5 |
| 8 | 6.25 | 6.5 | 6.75 | >100 | >100 | >100 | 73.3 | 72.5 | 72.3 |
| 9 | 4.0 | 4.5 | 5.0 | <1 | <1 | <1 | 78.4 | 78.1 | 77.9 |
| 10 | 2.0 | 2.0 | 2.5 | <1 | <1 | <1 | 79.4 | 79.1 | 78.8 |
| 11 | 6.5 | 6.0 | 6.0 | 4.4 | 5.6 | 6.4 | 74.5 | 74.1 | 73.6 |
| 12 | 5.0 | 5.5 | 6.0 | 3.5 | 4.2 | 5.1 | 74.8 | 74.3 | 74.2 |
| 13 | 4.5 | 5.0 | 5.25 | 2.0 | 3.4 | 3.7 | 74.6 | 74.2 | 73.8 |
| Control* | 1 | 1 | 1 | <1 | <1 | <1 | 81.2 | 81.2 | 81.2 |

*The control in this table and in Table II, infra, is the fabric treated only with deionized water employing the same pad/dry process.

As the data in Table I show, the emulsions of Examples 1, 2 and 7-13 are undesirable for their unacceptable levels of performance when evaluated for at least one of softness, wettability, or whiteness. The emulsions of examples 1, 7 and 8 exhibit poor wettability. The emulsions of Examples 2, 9, 10, 12 and 13 are undesirable for their poor softness at all three levels of application and that of Example 1 only marginally less so for exhibiting unacceptable softness at the 1.0 wt. % and 2.0 wt. % levels of application. The emulsions of Examples 1 and 7 are undesirable for their poor whiteness (resistance to yellowing). In contrast to Examples 1, 2 and 7-13, Examples 3-6 which are illustrative of aqueous emulsion compositions of the present invention show from a good to an outstanding balance of softness, wettability and whiteness properties.

Example 14

The emulsions of Examples 5-9 were applied to 100% cotton print cloth, 100% cotton knits and 65%/35% polyester/cotton blend print cloth employing the pad/dry process. The drying conditions were 130° C. for 5 minutes. The total applied amount of organopolysiloxanes based on fabric weight was 1.0 wt %. The softness, wettability and whiteness evaluations were based on the test methods described above. The results of the evaluation are presented below in Table II.

TABLE II

Evaluation of Organopolysiloxane Emulsions Applied to 100% Cotton Print Cloth ("Print")100% Cotton Knits ("Knits"), and 65/35 Polyester/Cotton Blend ("Blend")

| Example | Softness 1 = harshness; 8 = softness | | | Wettability (seconds) | | | Whiteness (The greater the value, the greater the resistance to yellowing) | | |
|---|---|---|---|---|---|---|---|---|---|
| | Print | Knits | Blend | Print | Knits | Blend | Print | Knits | Blend |
| 5 | 6.5 | 7 | 7 | 2.7 | 1 | 11 | 74.6 | 74.3 | 84.6 |
| 6 | 6.5 | 7 | 7 | 2.6 | 1.5 | 9 | 73.7 | 73.8 | 84.2 |
| 7 | 7 | 8 | 8 | >300 | >300 | >300 | 68.2 | 67.4 | 77.6 |
| 8 | 6 | 6.5 | 6.7 | >100 | >100 | >100 | 73.2 | 72.7 | 83.1 |
| 9 | 4 | 5 | 5 | <1 | <1 | 7 | 78.1 | 79.2 | 87.4 |
| Control | 1 | 1.5 | 2 | <1 | <1 | 3 | 81 | 82 | 88 |

As the data in Table II show, the emulsions of Examples 7 and 8 are unacceptable due to their poor wettability characteristics, the emulsion of Example 7 being additionally unacceptable for its poor whiteness, and the emulsion of Example 9 is unacceptable for its poor softness. Again, as in the test evaluations set forth in Table I, the emulsions of Examples 5 and 6 which are illustrative of the present invention demonstrate anywhere from a good to an excellent balance of softness, wettability and whiteness.

What is claimed is:

1. An organopolysiloxane composition which comprises:
a) organopolysiloxane I of the general formula

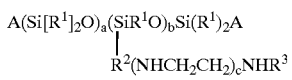

wherein each $R^1$ is, independently, an alkyl group of from 1 to 4 carbon atoms, $R^2$ is a divalent hydrocarbon group, $R^3$ is hydrogen or a monovalent hydrocarbon group, each A is, independently, an $R^1$ group or an $R^2(NHCH_2CH_2)_cNHR^3$ group, provided, that at least one A is an $R^2(NHCH_2CH_2)_cNHR^3$ group, a is from 1 to about 1000, b is from 0 to about 100 and c is from 0 to about 10;
b) organopolysiloxane II of the general formula

wherein n is from 2 to about 1000, A is a polysiloxane unit of the general formula

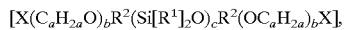

B is a polyalkyleneoxide unit of the general formula $[YO(C_aH_{2a}O)_dY]$, each $R^1$ is, independently, an alkyl group of from 1 to 4 carbon atoms, $R^2$ is a divalent organic group, X and Y are divalent organic groups selected from a secondary or tertiary amine and a ring-opened epoxide such that when X is a ring-opened epoxide, Y is a secondary or tertiary amine and when X is a secondary or tertiary amine, Y is a ring-opened epoxide, each a is, independently, from 2 to about 4, each b is independently from 0 to about 100, c is from 1 to about 500, d is from 0 to about 100 and the sum of b and d is from 1 to about 100;

c) organopolysiloxane III of the general formula

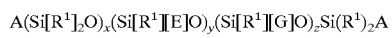

wherein each $R^1$ is, independently, an alkyl group of from 1 to 4 carbon atoms, E is a monovalent organic group containing at least one epoxy group, G is an $B(R^2)_bO(C_2H_4O)_c(C_3H_6O)_dR^3$ group in which $R^2$ is a divalent organic group, $R^3$ is hydrogen or a monovalent hydrocarbon group, acyl group or monoester carbonate group, b is 0 or 1, c is from 0 to about 50, d is from 0 to about 50 and the sum of c and d is from 1 to about 100, each A is, independently, an $R^1$ or E group, x is from 0 to about 2000, y is from 0 to about 2000, z is from 1 to about 100 and the sum of x and y is from 1 to about 2000; and, d) organopolysiloxane IV of the general formula

wherein each $R^1$ is, independently, an alkyl group of from 1 to 4 carbon atoms, G is an $B(R^2)_bO(C_2H_4O)_c(C_3H_6O)_dR^3$ group in which $R^2$ is a divalent organic group, $R^3$ is hydrogen, a monovalent hydrocarbon group, an acyl group or a monoester carbonate group, b is 0 or 1, c is from 0 to about 50, d is from 0 to about 50 and the sum of c and d is from 1 to about 100, each A is, independently, an $R^1$ group or a monovalent organic group containing at least one epoxy group; x is from 0 to about 2000, y is from 0 to about 2000, and the sum of x and y is from 1 to about 2000.

2. The composition of claim 1 wherein in organopolysiloxane I, $R^1$ is methyl, $R^2$ is ethylene or propylene, $R^3$ is methyl, a is from about 50 to about 700, b is from 1 to about 30, c is from 1 to 4 and the sum of a and b is from about 50 to about 730.

3. The composition of claim 1 wherein in organopolysiloxane II, n is from about 1 to about 10, each $R^1$ is methyl, $R^2$ is ethylene or propylene, each a is 2 or 3, each b is from about 1 to about 50, c is from about 10 to about 100, d is from about 1 to about 50, the sum of b and d is from about 10 to about 50, when a ring-opened epoxide, X or Y is a $CCH_2CH(OH)(CH_2)_vCH(OH)CH_2C$, $CCH[CHOH](CH_2)_vCH(CH_2OH)C$, $CCH_2CH(OH)(CH_2)_vCH[CH_2OH]C$, $C(CH_2)_vOCH_2CH(OH)CH_2C$ or $C(CH_2)_vOCH_2CH(CH_2[OH])C$ group in which v is from 2 to about 6, or a ring-opened epoxide derived from ω-(3,4-epoxycyclohexyl) alkylene, β-(3,4-epoxycyclohexyl) ethylene, β-(3,4-epoxycyclohexyl)-β-methyethylene or β-(3,4-epoxy-4- methylcyclohexyl)-β-methyethylene, and when a secondary or tertiary amine, X or Y is of the type $BR^4N(R^3)(R^4)_gB$ in which $R^3$ is hydrogen or an alkyl group of from 1 to 4 carbon atoms, $R^4$ is an alkylene, cycloaliphatic alkylene or aralkylene group, which can include heteroatom(s), g is 0 or 1, and the amine functionality is present in the terminal A group of the $(AB)_n$ A polymer.

4. The composition of claim 1 wherein in organopolysiloxane III, $R^1$ is methyl, E is an epoxy-containing group of the structure

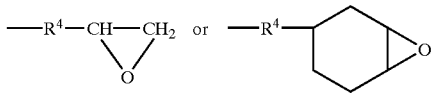

which $R^4$ is a divalent substituted or unsubstituted organic group, in group G, divalent organic group $R^2$ is selected from alkylene groups of from 1 to about 5 carbon atoms and groups in which a $BC_6H_4B$ group, BCOB group or BNHCOB group is bonded to an alkylene group, group $R^3$ is hydrogen, an alkyl group of from 1 to 4 carbon atoms, an acyl group of from 1 to 4 carbon atoms or a monoester carbonate group of from 1 to 4 carbon atoms in its ester moiety, b is 3, c is from 1 to about 35, d is from 1 to about 35, the sum of c and d is from 2 to about 70, A is methyl or an E group, x is from about 10 to about 1000, y is from 1 to about 100, z is from 1 to about 50 and the sum of x and y is from about 10 to about 1100.

5. The composition of claim 1 wherein in organopolysiloxane IV, $R^1$ is methyl, in group G, divalent organic group $R^2$ is selected from alkylene groups of from 1 to about 5 carbon atoms and groups in which a $BC_6H_4B$ group, BCOB group or BNHCOB group is bonded to an alkylene group, group $R^3$ is hydrogen, an alkyl group of from 1 to 4 carbon atoms, an acyl group of from 1 to 4 carbon atoms or a monoester carbonate group of from 1 to 4 carbon atoms in its ester moiety, b is 3, c is from 1 to about 35, d is from 1 to about 35, the sum of c and d is from 2 to about 70, A is methyl or an epoxy-containing group E of the structure

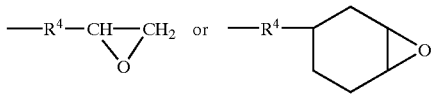

which $R^4$ is a divalent substituted or unsubstituted organic group, x is from about 10 to about 1000, y is from 1 to about 100 and the sum of x and y is from about 10 to about 1100.

6. The composition of claim 1 including at least one emulsifier.

7. The composition of claim 6 wherein at least about 50 weight percent of the total weight of emulsifier is nonionic surface active agent of which the overall hydrophilic lipophilic balance value is from about 8 to about 14.

8. The composition of claim 6 including at least one co-emulsifier.

9. The composition of claim 8 wherein the co-emulsifier is selected from the group consisting of alkoxytriglycol, polyalkylene glycol alkyl ether and mixtures thereof.

10. The composition of claim 9 wherein the alkoxytriglycol is selected from the group consisting of methoxytriglycol, ethoxytriglycol, propoxytriglycol, butoxytriglycol and mixtures thereof.

11. The composition of claim 9 wherein the polyalkylene glycol alkyl ether is selected from the group consisting of diethylene glycol monomethyl ether, diethylene glycol dimethyl ether, dipropylene glycol dimethyl ether, dibutylene glycol monomethyl ether, dibutylene glycol dimethyl ether and mixtures thereof.

12. The composition of claim 7 including at least one co-emulsifier.

13. The composition of claim 12 wherein the co-emulsifier is selected from the group consisting of alkoxytriglycol, polyalkylene glycol alkyl ether and mixtures thereof.

14. The composition of claim 13 wherein the alkoxytriglycol is selected from the group consisting of methoxytriglycol, ethoxytriglycol, propoxytriglycol, butoxytriglycol and mixtures thereof.

15. The composition of claim 13 wherein the polyalkylene glycol alkyl ether is selected from the group consisting of diethylene glycol monomethyl ether, diethylene glycol dimethyl ether, dipropylene glycol dimethyl ether, dibutylene glycol monomethyl ether, dibutylene glycol dimethyl ether and mixtures thereof.

16. The composition of claim 15 wherein the dipropylene glycol alkyl ether is selected from the group consisting of diethylene glycol monomethyl ether, diethylene glycol dimethyl ether, dipropylene glycol dimethyl ether, dibutylene glycol monomethyl ether, dibutylene glycol dimethyl ether and mixtures thereof.

17. The composition of claim 6 including an emulsion-forming amount of water.

18. The composition of claim 7 including an emulsion-forming amount of water.

19. The composition of claim 8 including an emulsion-forming amount of water.

20. The composition of claim 9 including an emulsion-forming amount of water.

21. The composition of claim 12 including an emulsion-forming amount of water.

22. The composition of claim 14 including an emulsion-forming amount of water.

23. The composition of claim 1 wherein in organopolysiloxane I, $R^1$ is a methyl group, $R^2$ is an ethylene or propylene group, each a is from about 50 to about 700, b is from 1 to about 30, c is from about from 1 to 4, the sum of a and b is from about 50 to about 730; in organopolysiloxane II, n is preferably from 1 to about 10, each $R^1$ is a methyl group, $R^2$ is an ethylene or propylene group, each a is 2 or 3, each b is from 1 to about 50, c is from about 10 to about 100, d is from 1 to about 50, the sum of b and d is from about 10 to about 50, when a ring-opened epoxide, X or Y is a $CCH_2CH(OH)(CH_2)_vCH(OH)CH_2C$, $CCH[CH_2OH](CH_2)_v$ $CH(CH_2OH)C$, $CCH_2CH(OH)(CH_2)_vCH[CH_2OH]C$, $C(CH_2)_vOCH_2CH(OH)CH_2C$ or $C(CH_2)_vOCH_2CH(CH_2[OH])C$ group in which v is from 2 to about 6, or a ring-opened epoxide derived from ω-(3,4-epoxycyclohexyl) alkylene, β-(3,4-epoxycyclohexyl) ethylene, β-(3,4-epoxycyclohexyl)-β-methyethylene or β-(3,4-epoxy-4-methylcyclohexyl)-β-methyethylene, and when a secondary or tertiary amine, X or Y is of the type $BR^4N(R^3)(R^4)_gB$ in which $R^3$ is hydrogen or an alkyl group of from 1 to 4 carbon atoms, $R^4$ is and alkylene, cycloaliphatic alkylene or aralkylene group, which may include heteroatom(s), g is 0 or 1, and the amine functionality is present in the terminal A group of the $(AB)_n$ A polymer; in organopolysiloxane III, $R^1$ is methyl, E is an epoxy-containing group of the structure

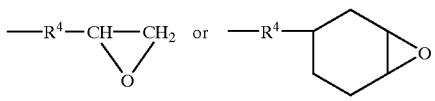

in which R⁴ is a divalent substituted or unsubstituted organic group, in group G, divalent organic group R² is selected from alkylene groups of from 1 to about 5 carbon atoms and groups in which a BC₆H₄B group, BCOB group or BNHCOB group is bonded to an alkylene group, group R³ is hydrogen, an alkyl group of from 1 to 4 carbon atoms, an acyl group of from 1 to 4 carbon atoms or a monoester carbonate group of from 1 to 4 carbon atoms in its ester moiety, b is 3, c is from 1 to about 35, d is from 1 to about 35, the sum of c and d is from 2 to about 70, A is methyl or an E group, x is from about 10 to about 1000, y is from 1 to about 100, z is from 1 to about 50 and the sum of x and y is from about 10 to about 1100, and, in organopolysiloxane IV, R¹ is methyl, in group G, divalent organic group R² is selected from alkylene groups of from 1 to about 5 carbon atoms and groups in which a BC₆H₄B group, BCOB group or BNHCOB group is bonded to an alkylene group, group R³ is hydrogen, an alkyl group of from 1 to 4 carbon atoms, an acyl group of from 1 to 4 carbon atoms or a monoester carbonate group of from 1 to 4 carbon atoms in its ester moiety, b is 3, c is from 1 to about 35, d is from 1 to about 35, the sum of c and d is from 2 to about 70, A is methyl or an epoxy-containing group of the structure

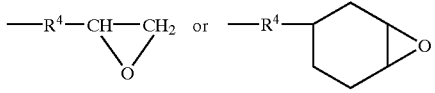

in which R⁴ is a divalent substituted or unsubstituted organic group, x is from about 10 to about 1000, y is from 1 to about 100 and the sum of x and y is from about 10 to about 1100.

24. The composition of claim 23 including at least one emulsifier.

25. The composition of claim 24 wherein at least about 50 weight percent of the total weight of emulsifier is nonionic surface active agent of which the overall hydrophilic lipophilic balance value is from about 8 to about 14.

26. The composition of claim 23 including at least one co-emulsifier.

27. The composition of claim 24 wherein the co-emulsifier is selected from the group consisting of alkoxytriglycol, polyalkylene glycol alkyl ether and mixtures thereof.

28. The composition of claim 25 wherein the alkoxytriglycol is selected from the group consisting of methoxytriglycol, ethoxytriglycol, propoxtriglycol, butoxytriglycol and mixtures thereof.

29. The composition of claim 27 wherein the polyalkylene glycol alkyl ether is selected from the group consisting of diethylene glycol monomethyl ether, diethylene glycol dimethyl ether, dipropylene glycol dimethyl ether, dibutylene glycol monomethyl ether, dibutylene glycol dimethyl ether and mixtures thereof.

30. The composition of claim 25 including at least one co-emulsifier.

31. The composition of claim 30 wherein the co-emulsifier is selected from the group consisting of alkoxytriglycol, polyalkylene glycol alkyl ether and mixtures thereof.

32. The composition of claim 31 wherein the alkoxytriglycol is selected from the group consisting of methoxytriglycol, ethoxytriglycol, propoxytriglycol, butoxytriglycol and mixtures thereof.

33. The composition of claim 31 wherein the polyalkylene glycol alkyl ether is selected from the group consisting of diethylene glycol monomethyl ether, diethylene glycol dimethyl ether, dipropylene glycol dimethyl ether, dibutylene glycol monomethyl ether, dibutylene glycol dimethyl ether and mixtures thereof.

34. The composition of claim 24 including an emulsion-forming amount of water.

35. The composition of claim 25 including an emulsion-forming amount of water.

36. The composition of claim 26 including an emulsion-forming amount of water.

37. The composition of claim 27 including an emulsion-forming amount of water.

38. The composition of claim 30 including an emulsion-forming amount of water.

39. The composition of claim 31 including an emulsion-forming amount of water.

40. A method of making an emulsion-forming organopolysiloxane composition which comprises combining organopolysiloxanes I-IV of claim 1 with emulsifier and co-emulsifier selected from the group consisting of alkoxytriglycol, polyalkylene glycol alkyl ether and mixtures thereof.

41. The method of claim 40 wherein at least about 50 weight percent of the total weight of emulsifier is nonionic surface active agent of which the overall hydrophilic lipophilic balance value is from about 8 to about 14.

42. The method of claim 40 wherein the alkoxytriglycol is selected from the group consisting of methoxytriglycol, ethoxytriglycol, propoxytriglycol, butoxytriglycol and mixtures thereof.

43. The method of claim 40 wherein the polyalkylene glycol alkyl ether is selected from the group consisting of diethylene glycol monomethyl ether, diethylene glycol dimethyl ether, dipropylene glycol dimethyl ether, dibutylene glycol monomethyl ether, dibutylene glycol dimethyl ether and mixtures thereof.

44. The method of claim 41 wherein the alkoxytriglycol is selected from the group consisting of methoxytriglycol, ethoxytriglycol, propoxytriglycol, butoxytriglycol and mixtures thereof.

45. The method of claim 41 wherein the polyalkylene glycol alkyl ether is selected from the group consisting of diethylene glycol monomethyl ether, diethylene glycol dimethyl ether, dipropylene glycol dimethyl ether, dibutylene glycol monomethyl ether, dibutylene glycol dimethyl ether and mixtures thereof.

46. A method of making an aqueous organopolysiloxane emulsion which comprises combining organopolysiloxanes I-IV of claim 1 with emulsifier and co-emulsifier selected from the group consisting of alkoxytriglycol, dipropylene glycol alkyl ether and mixtures thereof, and an emulsion-forming amount of water, the water being combined either concurrently with organopolysiloxanes I-IV, emulsifier and co-emulsifier or following the prior combination of organopolysiloxanes I-IV, emulsifier and co-emulsifier.

47. The method of claim 46 wherein at least about 50 weight percent of the total weight of emulsifier is nonionic surface active agent of which the overall hydrophilic lipophilic balance value is from about 8 to about 14.

48. The method of claim 46 wherein the alkoxytriglycol is selected from the group consisting of methoxytriglycol, ethoxytriglycol, propoxytriglycol, butoxytriglycol and mixtures thereof.

49. The method of claim 46 wherein the polyalkylene glycol alkyl ether is selected from the group consisting of diethylene glycol monomethyl ether, diethylene glycol dimethyl ether, dipropylene glycol dimethyl ether, dibutylene glycol monomethyl ether, dibutylene glycol dimethyl ether and mixtures thereof.

50. The method of claim 48 wherein the alkoxytriglycol is selected from the group consisting of methoxytriglycol, ethoxytriglycol, propoxytriglycol, butoxytriglycol and mixtures thereof.

51. The method of claim 49 wherein the polyalkylene glycol alkyl ether is selected from the group consisting of diethylene glycol monomethyl ether, diethylene glycol dimethyl ether, dipropylene glycol dimethyl ether, dibutylene glycol monomethyl ether, dibutylene glycol dimethyl ether and mixtures thereof.

52. A method of treating a textile fiber or fabric substrate which comprises applying to the substrate a substrate-treating amount of the composition of claim 17.

53. A method of treating a textile fiber or fabric substrate which comprises applying to the substrate a substrate-treating amount of the composition of claim 34.

* * * * *